United States Patent
Cid-Aguilar et al.

(10) Patent No.: US 7,732,360 B2
(45) Date of Patent: *Jun. 8, 2010

(54) COLORLESS GLASS COMPOSITION

(75) Inventors: José Guadalupe Cid-Aguilar, Ecatepec de Morelos (MX); Rafael Enrique Pinto-Negroe, Nueva Vallejo (MX); Herbert Scheffler-Hudlet, Atizapan Estado de México (MX)

(73) Assignee: Vidrio Plano De Mexico, S.A. DE C.V., Tlalnepantla (MX)

( * ) Notice: Subject to any disclaimer, the term of this patent is extended or adjusted under 35 U.S.C. 154(b) by 1019 days.

This patent is subject to a terminal disclaimer.

(21) Appl. No.: 10/829,093

(22) Filed: Apr. 20, 2004

(65) Prior Publication Data

US 2005/0233891 A1    Oct. 20, 2005

(51) Int. Cl.
C03C 3/087 (2006.01)
(52) U.S. Cl. ...................................................... 501/70
(58) Field of Classification Search .................. 501/70, 501/71
See application file for complete search history.

(56) References Cited

U.S. PATENT DOCUMENTS

| | | | |
|---|---|---|---|
| 5,030,593 A | 7/1991 | Heithoff | |
| 5,030,594 A | 7/1991 | Heithoff | |
| 5,346,768 A | 9/1994 | Winter et al. | |
| 5,656,559 A | 8/1997 | Combes et al. | |
| 6,218,323 B1 | 4/2001 | Bretschneider et al. | |
| 6,258,740 B1 | 7/2001 | Machishita et al. | |
| 7,169,722 B2 * | 1/2007 | Landa et al. | 501/71 |
| 2003/0114291 A1 * | 6/2003 | Koyama et al. | 501/64 |
| 2003/0181309 A1 * | 9/2003 | Kunert et al. | 501/71 |
| 2007/0015654 A1 * | 1/2007 | Scheffler-Hudlet et al. | 501/70 |

OTHER PUBLICATIONS

N.E. Densem, "The equilibrium between ferrous and ferric oxides in glasses", *Journal of the Society of Glass Technology*, Glasgow, England, pp. 373-389, May 1937.

J.C. Hostetter and H.S. Roberts, "Note on the Dissociation of Ferric Oxide Dissolved in Glass and its Relation to the Color of Iron-Bearing Glasses", *Journal of the American Ceramic Society*, pp. 927-938, USA, Sep. 1921.

M.D. Beals, "Effect of Titanium Dioxide in Glass", *The Glass Industry*, pp. 495-501, Sep. 1963.

* cited by examiner

Primary Examiner—Karl E Group
Assistant Examiner—Elizabeth A Bolden
(74) Attorney, Agent, or Firm—Abelman, Frayne & Schwab

(57) ABSTRACT

The invention is a colorless glass composition having a base glass composition, comprising, in weight percentage, from about 0.01 to 0.03 wt % of $Fe_2O_3$; about 20-30% reduction (% $Fe^{+2}$) and about 0.05 to 1 wt % of $TiO_2$, the glass having a visible light transmission of at least 89%, a ultraviolet radiation transmittance of no more than 81%; a solar direct transmission of no more than 90%; a dominant wavelength from 600 nm to 490 nm; and a purity of less than 2%.

4 Claims, 3 Drawing Sheets

COLORLESS GLASS COMPOSITION

BACKGROUND OF THE INVENTION

1. Field of the Invention

This invention refers to a colorless soda-lime-silica glass composition, and more particularly relates to a colorless glass composition that utilizes less than 0.03 wt % of ferric oxide and 0.05 to 1 wt % of titanium oxide to produce a colorless glass with a high visible light transmission for use in the construction, appliance, glazing and automotive industries.

2. Description of the Related Art

The well-known formulations of lime glass, which comprise a mixture of sodium oxide ($Na_2O$), lime (CaO) and silica ($SiO_2$), known also as "soda-lime-silica glass", are used in the production of "flat glass" for architectural use and, for use in the automotive industry.

For automotive use it is highly desirable that the glass have a high level or percentage of visible light transmission, in order to provide the driver with good visibility of his surroundings, thus complying with the norms of automotive safety.

Several patents have been developed for obtaining colorless glass, using a standard glass composition. For construction as well, it is highly desirable that the glass has a high level or percentage of visible light transmission, in order to provide a good vision area.

It is also desirable that the glass has the necessary absorption properties to absorb damaging infrared (IR) and ultraviolet (UV) solar radiation, so as to reduce the excessive heating of the houses or vehicles on sunny days.

Generally, a glass composition contains ferrous and ferric oxides. The balance between ferrous and ferric oxide has a direct effect on the color and transmittance properties of the glass. The iron is generally present in the glass as both ferrous oxide (FeO) and ferric oxide ($Fe_2O_3$) imparting to the glass a clear green-blue color.

In this manner, in a glass composition, the total amount of iron is present as both ferric oxide ($Fe_2O_3$) and as ferrous oxide (FeO), since even when pure ferric oxide is used in the basic raw material during the glass forming process, a portion of the ferric oxide is reduced and is transformed into ferrous oxide.

Normally, the total amount of iron in the glass is expressed as ferric oxide ($Fe_2O_3$) independent of the reduction state of iron. It is also standard in this industry to express the quantity of ferrous or ferric oxide as a percentage of the total iron, namely:

$$\% \ Fe^{+2} \ (FERROUS) = \frac{FeO \times 100}{Total \ Fe_2O_3}$$

$$\% \ Fe^{+3} \ (FERRIC) = \frac{Fe_2O_3 \times 100}{Total \ Fe_2O_3}$$

The iron oxides (ferric and ferrous) impart different optical properties to the glass, the total quantity of iron present and its equilibrium as ferric or ferrous have a direct impact on the color, light transmission and absorption of infrared and ultraviolet radiations.

The ferric oxide absorbs ultraviolet energy (low transmission level), having at the same time high visible light and infrared energy transmissions.

By contrast, ferrous oxide absorbs infrared energy (low transmission), with a high ultra-violet transmission, and a lower level of visible light transmission and possesses a more intense blue color.

Therefore, the greater the quantity of $Fe_2O_3$ present in the glass, the greater will be the absorption of ultraviolet radiation, and the light transmission is also increased but, as the content of FeO is increased as a result of the chemical reduction of $Fe_2O_3$, the absorption of the infrared radiation will increase, while the absorption of the ultraviolet radiation is decreased and the light transmission is also undesirably decreased.

The greater the concentration of FeO in relation to $Fe_2O_3$, results in a change in the color of the glass. The shift toward a higher concentration of FeO in relation to the $Fe_2O_3$ causes a change of color of the glass from a yellow to yellow-green to a darker blue-green which is undesirable, since it reduces the light transmission of the glass.

Therefore, to manufacture a glass with predetermined properties and color, one must have the correct amount of total iron and correct proportion of $Fe_2O_3$ and FeO, taking into account that what is increased on the ferrous side, will diminish on the ferric side, and consequently one must arrive at a compromise of properties since improving (lowering) the value of one property will worsen (raise) the value of the other properties.

In order to increase the absorption of the infrared and ultraviolet radiation without sacrificing the transmission of the visible spectrum, it has been necessary to lower the total content of the iron which is highly reduced from ferric to ferrous, to less than 0.70% of total iron expressed as $Fe_2O_3$.

Depending on the state of reduction of the glass, the coloring changes are as follows:

Low Ferrous (12%)—Yellow—High Light Transmission (High Ferric)
Yellow-Green
Green-Yellow
Green (Desirable)
Green-Blue
Blue-Green
Blue
High Ferrous (75%)—Amber—Low Light Transmission (Low Ferric)

Additionally, it is known that the oxides of titanium, molybdenum and cerium, principally of cerium, are also colorants, and when they are used in combination with the $Fe_2O_3$, it is possible to obtain an additional reduction of the ultraviolet light transmission to a point where the sought for visibility transmission is achieved. It does, however, suffer from the disadvantage of its high cost, which makes the formulation very expensive, and has a tendency to oxidize the iron to $Fe_2O_3$.

On the other hand, the effects produced by the use of titanium dioxide include the fact that $TiO_2$ greatly increases the refractive index, increases the absorption of light in the ultraviolet region, and lowers the viscosity and surface tension. From the data on the use of titanium dioxide in enamels, it has been noted that $TiO_2$ increases the chemical durability and acts as a flux. In general, clear glasses containing titanium dioxide may be found in all of the common glass-forming systems, such as borates, silicates, and phosphates. The various regions of glass formation for systems containing titanium dioxide are not grouped in any one place, since the organization of the discussion is based more on the properties in uses of glasses containing titanium dioxide than on their constitution alone.

Many patents have been issued on colored glass compositions with infrared and ultraviolet radiation absorbing characteristics. U.S. Pat. No. 5,030,593 issued to Robert Heithoff on Jul. 9, 1991, discloses a clear glass, with the substantial absence of color in transmittance, and with an attractive, bright, edge coloration compatible with wood tone surroundings is achieved in a glass having greater than 85 percent, preferably greater than 87 percent, luminous transmittance by minimizing the amount of iron oxide present in the glass and including very small amounts of selenium and optionally cobalt oxide. Various warm, wood tone compatible colors at the edge can be attained, including a "honey" color and almost neutral grays.

U.S. Pat. No. 5,030,594 issued to Robert Heithoff on Jul. 9, 1991, is related to a clear glass, with the substantial absence of color in transmittance, and with an attractive, bright, pure azure edge coloration is achieved in a glass having greater than 87 percent, preferably greater than 90 percent, luminous transmittance by using very small amounts of iron oxide as the sole essential colorant, with the ratio of iron in the ferrous state to total iron being at least 0.4.

U.S. Pat. No. 5,346,768 issued to Ernst Winter et al, on Sep. 13, 1994, discloses a soda-lime glass containing vanadium, in particular a flat glass produced by the float glass process with high UV absorption for wavelengths below 350 nm. The purpose of the invention is to provide a simple and cost effective producible flat glass, in particular a glass produced by the float glass process with high UV absorption without reduction of the neutrality of color or significant reduction of the total light transmittance (as defined in DIN 1249, Part 10).

U.S. Pat. No. 5,656,559 issued to Jean-Marie Combes et al on Aug. 17, 1997, is related a soda-lime-silica glass composition which enables panes to be produced that have a lower coloration than that of the known glasses and a better absorption of the infrared radiation, even with the same iron content in the form of FeO and the same thickness.

The U.S. Pat. No. 6,218,323 issued Joachin Bretschneider and Hubert Drexler on Apr. 17, 2001, describes a neutral-colored soda-lime-silicate glass with high light transmission in the visible region. The glass has a basic composition which contains at least the following constituents: $SiO_2$, 66-75 weight %; $Na_2O$, 10-20 weight %; CaO, 5-15 weight %; MgO, 0-6 weight %; $Al_2O_3$, 0-5 weight %; and $K_2O$, 0-5 weight %; and incorporates a colorant portion comprising the following constituents: Co, 0.1-1 ppm; $Fe_2O_3$, 0.1 to req. 0.03 weight % (total iron content); and $FeO/Fe_2O_3$, <0.4. The glass possesses a light transmittance (illuminant D 65 according to DIN 67 507) of at least 89% at a reference thickness of 4 mm.

Finally, the U.S. Pat. No. 6,258,740 issued to Hiroshi Machishita, et al, on Jul. 10, 2001, describes an ultraviolet ray absorbing soda-lime glass. This glass contains less than 0.10 wt % of iron in terms of $Fe_2O_3$, which is optionally contained as an impurity in the glass, 0.7-2.6 wt % of $CeO_2$, 0-1.3 wt % of $TiO_2$, 0-0.12 wt % of $V_2O_5$, 0.08-0.30 wt % of sulfur in terms of $SO_3$, and 0-0.0025 wt % of CoO. The glass at a thickness of 5 mm is not higher than 10% in ultraviolet radiation transmittance, is not lower than 80% in visible light transmittance, and is from 530 to 575 nm in dominant wavelength. The glass is transparent and clear, superior in ultraviolet ray absorption capability, and high in visible light transmittance.

With respect to the foregoing, many others patents and papers have been published on colored glass compositions with infrared and ultraviolet radiation absorbing characteristics, to describe the importance of the equilibrium between ferrous and ferric oxides in glasses. For example "N. E. Densem; The equilibrium between ferrous and ferric oxides in glasses; Journal of the Society of Glass Technology, Glasgow, England, May 1937, pp. 374-389"; "J. C. Hostetter and H. S. Roberts, "Note on the dissociation of Ferric Oxide dissolved in glass and its relation to the color of iron-bearing glasses; Journal of the American Ceramic Society, USA, September, 1921, pp. 927-938".

However, as it can be clearly appreciated from the above patents, in order to express the visible light transmission characteristics of a glass, it is necessary to take into account the following three main points:

1. The thickness at which it is measured, since the transmission of UV, visible light and infrared decrease in direct relation with the increase of the thickness of the glass.

2. The wavelengths of the different zones, for example the UV transmission is considered to be from 300 to 400 nm (General Motors); from 300 to the half the value of 400 nm (Ford), since the other half is transferred to the visible light; from 300 to 390 nm (PPG's U.S. Pat. No. 5,240,866); from 280 to 380 nm in ISO9050; as well as if the increments were from 2.5, 5 or 10 nm. Consequently, there will be different values when measuring the ultraviolet transmission for the same product.

3. The Standard utilized in respect to the solar energy, should be established beforehand, for example: "CIE PUBL:" 40; and the air mass, Perry & Moon Air Mass=2, Air Mass=1.0 or air mass 1.5 as recent GMW3136 standard.

According to the present invention, there is provided a soda-lime-silica glass composition that utilizes ferric oxide and titanium oxide to produce a glass suitable for use in the appliances, glazing, construction and automotive industry with a thickness of about 3 to 4 mm and preferably about 3.2 mm.

Papers have been written on the behavior of the Titanium $TiO_2$ in the transmission of colorless glasses. i.e. Striple, J. H. "Titanium dioxide its effect on the transmission of various glasses", The glass industry/April 1964, pp 193-196. The author comments that the $TiO_2$ optically changes the light transmission to a major wavelength, extending the transmission range in the infrared and absorbing more in the ultraviolet.

The more stable form of titanium in the glass is the tetravalent ($Ti^{4+}$) which is colorless with only the trivalent form ($Ti^{3+}$) producing color. However, the color produced by $Ti^{3+}$ has not been found in soda-lime-silica glasses.

M. D. Beals in the paper, "Effects of Titanium Dioxide in Glass", "The glass industry, September, 1963, pp 495-53, describes the interest that has been shown the titanium dioxide as a constituent of glasses. The effects produced by the use of titanium dioxide included the comments that $TiO_2$ greatly increases the refractive index, increases the absorption of light in the ultraviolet region, and that is lowers the viscosity and surface tension. From the data on the use of titanium dioxide in enamels, they noted that $TiO_2$ increases the chemical durability and acts as a flux. In general, clear glasses containing titanium dioxide may be found in all of the common glass-forming systems (borates, silicates, and phosphates). The various regions of glass formation for systems containing titanium dioxide are not grouped in any one place, since the organization of the discussion is based more on the properties than use of glasses containing titanium dioxide than on their constitution alone.

From the above, the present invention is related to a colorless soda-lime-silica glass composition which contains less than 0.03 wt % of $Fe_2O_3$ and from 0.05 to 1 wt % of $TiO_2$. The glass at 3.2 mm is higher than 87% in visible light transmittance (Ilum D65 according ISO 9050) and higher than 89% more preferable.

SUMMARY OF THE INVENTION

It is therefore the main object of the present invention to provide a colorless soda-lime-silica glass composition which can be manufactured at a thickness of about 3.2 millimeters having a high light transmission with a value greater than 87, preferably a value greater than 89%.

Similarly another object of the present invention is to provide a colorless soda-lime-silica glass composition, of the previously mentioned nature, and which contains from about 0.01 to 0.03 wt % of $Fe_2O_3$ and about 0.05 to 1 wt % of $TiO_2$.

In addition, still another object of the present invention is to provide a colorless glass composition, which reduces the thickness of a glass sheet while maintaining its desirable properties of transmission of visible light and the absorption of solar direct and ultraviolet radiation.

An additional object of the present invention is to provide a colorless glass composition which increases the visible transmission from about 89.5% to about 91.7%, when a 0.6% $TiO_2$ is increased; however a similar concentration of $Fe_2O_3$ is maintained.

Another object of the present invention to provide a colorless glass composition whose production is more economical due to the absence of cerium oxide.

These and other objects and advantages of the colorless glass composition, of the present invention will become evident to persons who have knowledge in the field, from the following detailed description of the invention, in relation to a specific embodiment.

DETAILED DESCRIPTION OF THE INVENTION

Figure 1:
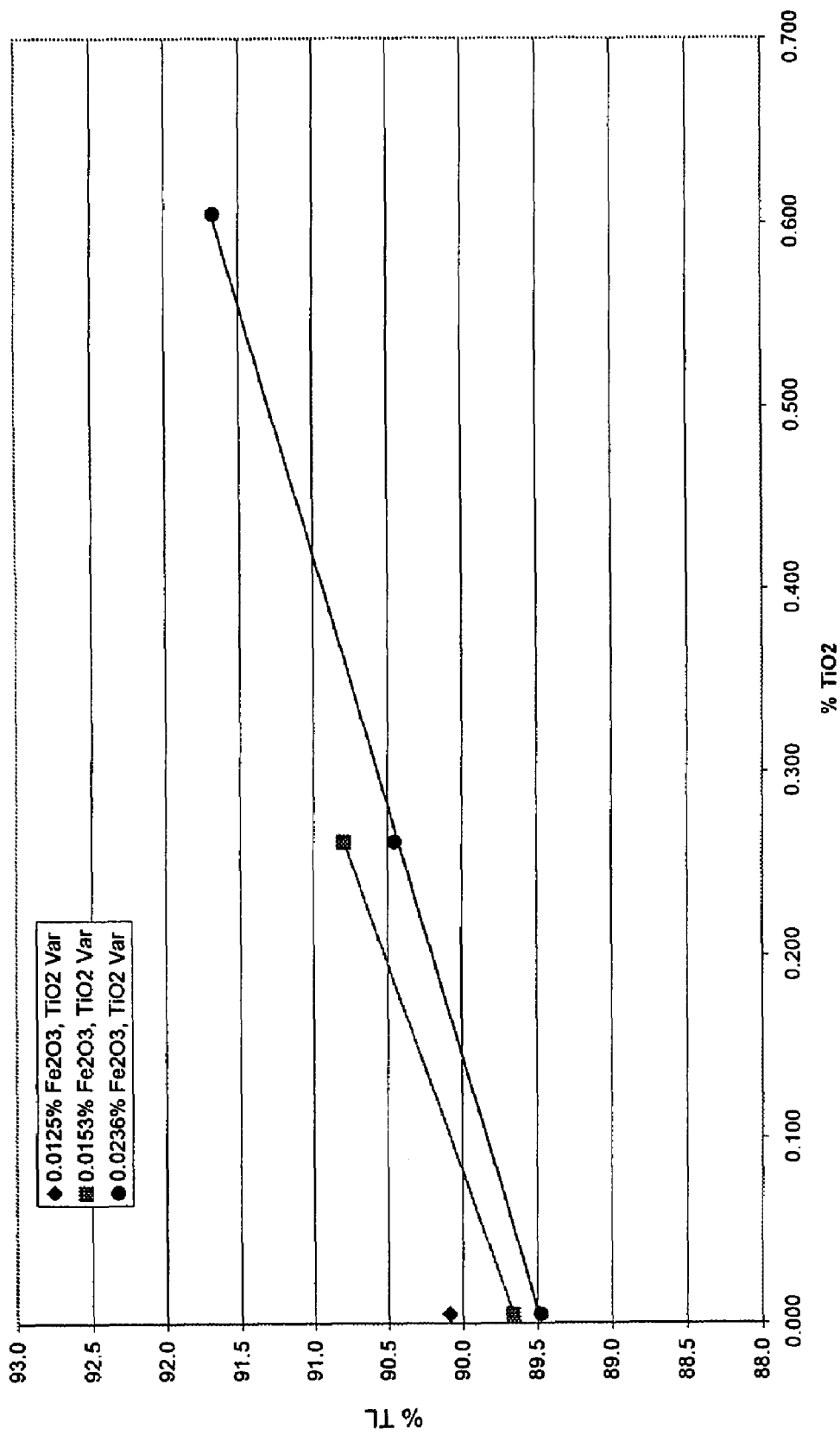
FIGS. 1 through 3 are graphs showing the behavior of % $TiO_2$ against visible light transmittance (TL), solar direct transmittance (TE) and ultraviolet radiation transmittance (TUV), respectively.
Figure 2:
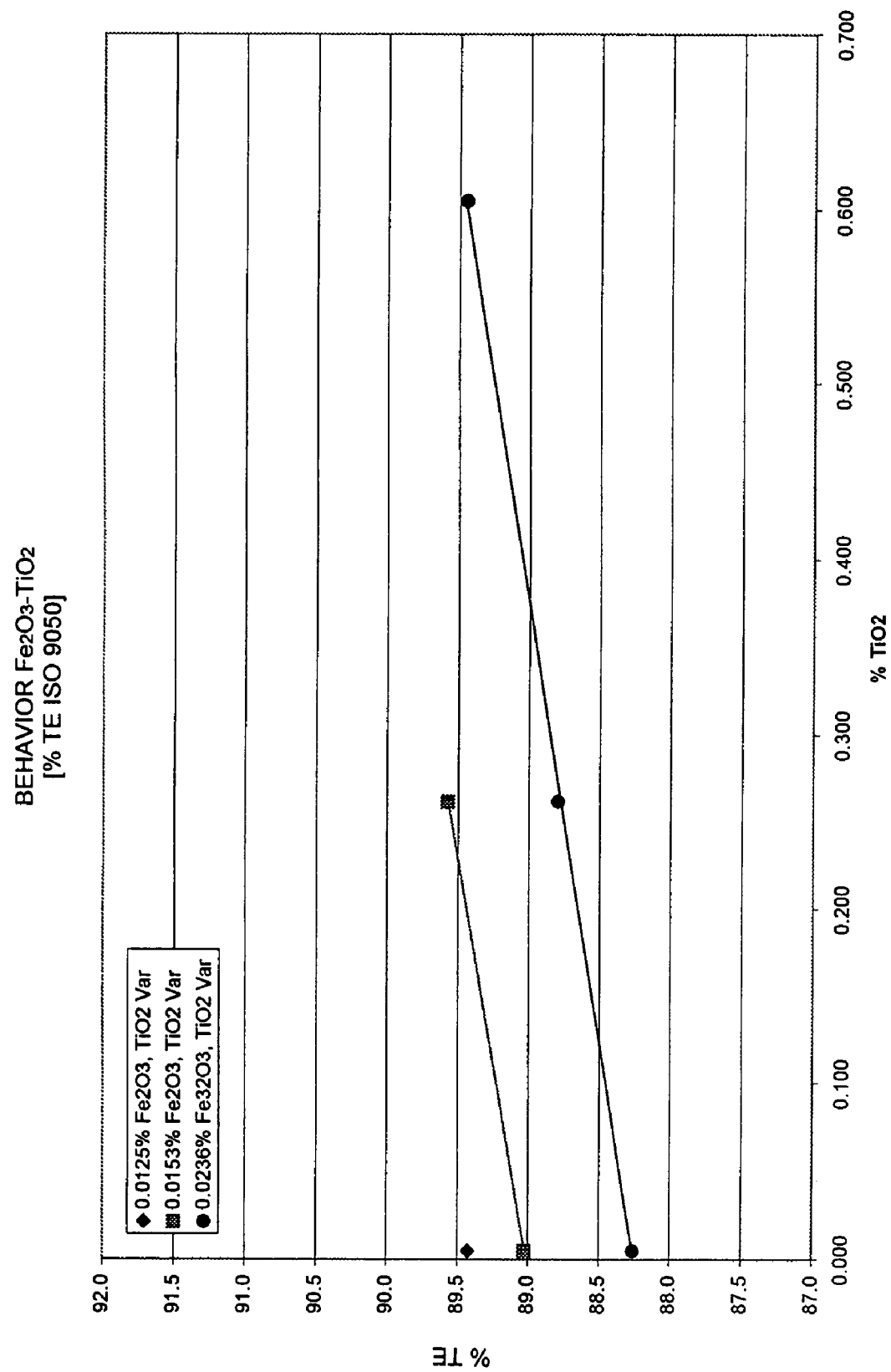
Figure 3:
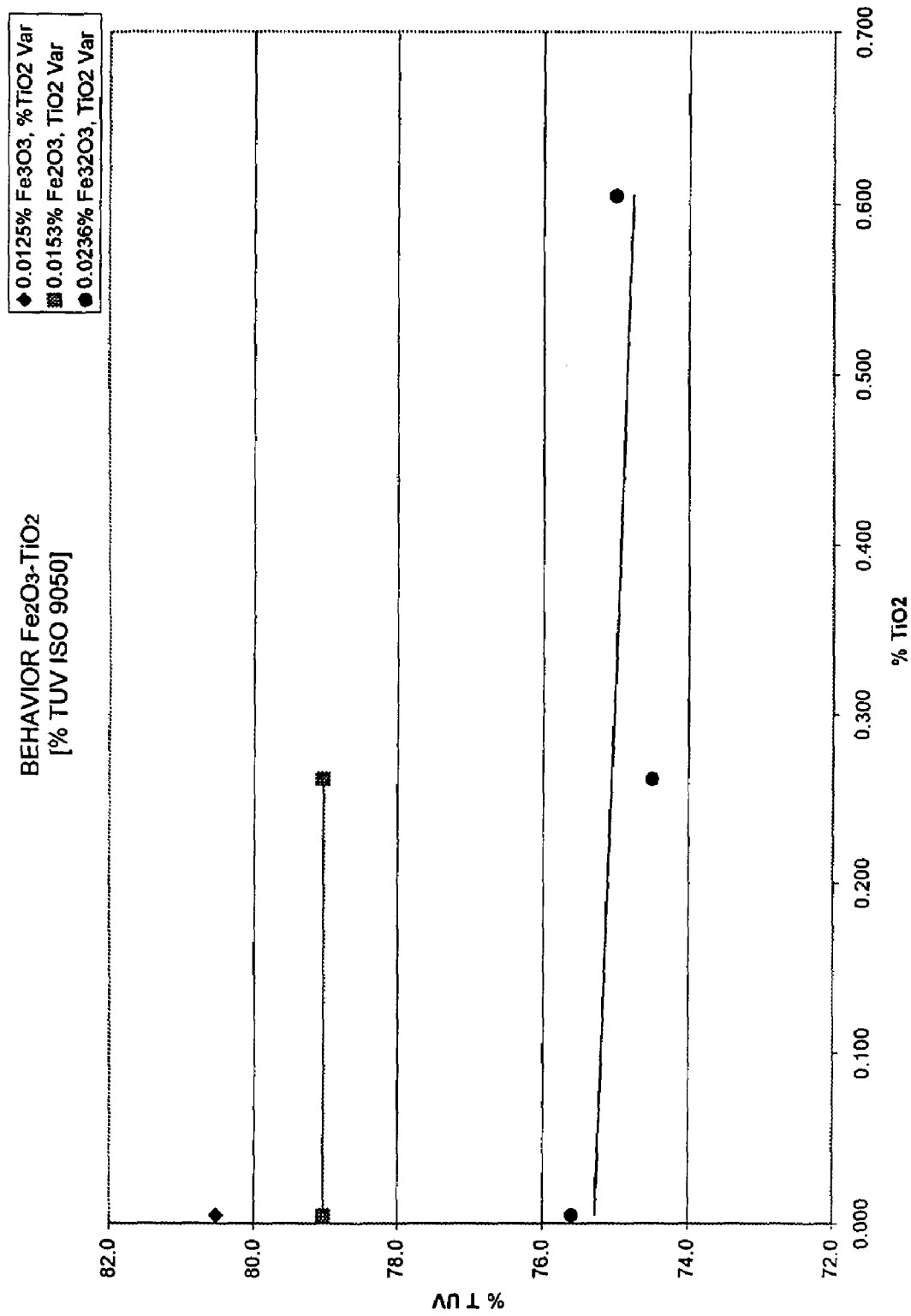

The invention will now be described in relation to a specific embodiment, wherein the amounts of the main components which are critical for obtaining a colorless glass composition with the desired properties of visibility transmission and the absorption of solar direct and ultraviolet radiation are set forth.

A typical composition of soda-lime-silica glass used in the construction and automotive industry, and formed by the so-called glass float process, is characterized by the following formulation based on wt. % with regard to the total weight of the glass:

| Components | % by weight |
|---|---|
| $SiO_2$ | 70 to 75 |
| $Na_2O$ | 10 to 15 |
| CaO | 5 to 10 |
| MgO | 0 to 5 |
| $K_2O$ | 0.0 to 3 |
| $Al_2O_3$ | 0.1 to 1.0 |

The colorless glass composition of the present invention is based on the above disclosed composition, in which the following compounds have been added:

| Components | % by weight |
|---|---|
| $TiO_2$ | 0.05 to 1.0 |
| $Fe_2O_3$ | 0.01 to 0.03 |
| Reduction (% $Fe^{+2}$) | 20-30 |

When the compounds were added to the basic composition, a glass sheet with a thickness of about 3.2 millimeters was manufactured, resulting in a visible light transmission (TL D65 according to ISO 9050) of at least 87%; a ultraviolet radiation transmittance (TUV according to ISO 9050) of no more than 81%; a solar direct transmittance (TE according to ISO 9050) of no more than 90%; a dominant wavelength from 600 nm to 490 nm; a purity of less than 2%; and a color tint as defined in the CIE Hunter Lab illuminant C, 2° standard observer, in the ranges ah (green-red) from 0 to −1.5; bh (blue-yellow) from −0.5 to 1.0, and having an Lh value greater than 93.

To obtain these measures, raw materials with a low content of $Fe_2O_3$ were requested, which are different than those used in commercial glasses. Sands with a maximum content of 0.010% $Fe_2O_3$ and dolomites with about 0.03% $Fe_2O_3$ were used and the limestone was substituted by the calcite about 0.010% Fe2O3. An example of a batch mixture that can be used to produce glass of the present invention is as follows:

| Batch | Parts by weight |
|---|---|
| Sand | 1000 |
| Soda ash | 327.1 |
| Dolomite | 256.9 |
| Saltcake | 12.3 |
| Calcite | 67.8 |
| Aluminum | 8.0 |

It is common in the glass industry to refer the total iron content in the glass composition or in the glass melting mixture, as the total iron expressed as $Fe_2O_3$.

When a lot of glass is melted, part of the amount of total iron is reduced to FeO, while the rest is maintained as $Fe_2O_3$. The balance between the ferric and ferrous oxidation states in the melted mixture are the result of an equilibrium of the final oxidation-reduction state, which is a mixture between the use of oxidizing or reducing agents in the feed mixture and to the combustion characteristics, for example, the air-gas relationship used in the furnace in order to melt the mixture. The reduction of ferric to ferrous, produces not only FeO, but also oxygen, decreasing the combined weight of the two iron compounds in the resulting glass.

Consequently, the combined weight of the FeO and $Fe_2O_3$ contained in the resulting glass composition, will be minor, less than that fed during the mixture and less than the total of the initial iron used expressed as $Fe_2O_3$. For this reason, it is understood that the total iron is the original iron expressed as $Fe_2O_3$, as it is used herein, as meaning the amount of iron fed in the mixture before its reduction. And it is to be understood that the reduction value of the ferrous state is defined as the weight of the ferrous oxide (FeO) expressed as ferric oxide ($Fe_2O_3$) in the glass product, divided by the weight percentage of total iron expressed as percentage.

The physical properties such as visible light transmission correspond to calculated variables based on internationally accepted standards. Accordingly, the light transmission is evaluated using the illuminant "D65". The wavelength range used for these purposes is from 380 to 780 nm, integrating values in numeric form with intervals of 10 nm. The solar direct transmission represents the heat which the glass achieves in direct form, evaluating it from 300 nm to 2500 nm with intervals of 50 nm, the numeric form of calculation uses as recognized standard values those reported by ISO 9050.

The calculation of the ultraviolet radiation transmission (UV), involves only the participation of the solar UV radiation, so that it is evaluated in the range of 280 to 380 nm of wavelength using intervals of 5 nm. For the infrared radiation transmission (IR), it is only contemplated, as well as the UV radiation, the range wherein the solar spectrum has influence, so that the range of the near infrared region from 800 to 2500 nm, with intervals of 50 nm, is used. Both calculations use the solar radiation values of ISO 9050 standard.

The amount of solar heat which is transmitted through the glass also can be calculated by the contribution of thermal energy with which participates each one of the regions wherein the solar spectrum has influence, which is from the ultraviolet region (280 nm), to near infrared region (2500 nm), which is of 3% for UV, 44% for the visible and of 53% for the IR, however, the values of the direct solar energy transmission, in the present invention, are calculated on the basis of a numeric integration taking into account the whole range of the solar spectrum of 300 to 2500 nm, with intervals of 50 nm and using the values of solar radiation reported ISO standards.

The specifications for the determination of color such as the dominant wave length and the purity of excitement have been derived from the tristimulus values (X, Y, Z), which have been adopted by the International Commission of Illumination (C.I.E.), as direct result of experiments involving many observers. These specifications could be determined by the calculation of the three-chromatic coefficients X, Y, Z of the tristimulus values that corresponding to the red, green and the blue colors, respectively. The three-chromatic values were graphicated in the chromaticity diagram and compared with the coordinates of the illuminant "C" considered as illumination standard. The comparison provides the information in order to determine the color purity excitement and its dominant wavelength. The dominant wavelength defines the wavelength of the color and its value is located in the visible range, of the 380 to 780 nm, while for the purity of excitement, the less the value is, the nearest tends to be a neutral color. A deeper understanding of the topics can be obtained from the "Handbook of Colorimetry" published by the "Massachusetts Institute of Technology", of Arthur C. Hardy, issued in 1936.

The color variables Lh, ah y bh of the color system Hunter Lab Color space, illuminant C, 2° standard observer are also calculated through the tristimulus values.

Table I shows the results obtained from experiments which were conducted, wherein the compounds considered in this invention were added, and were combined with a typical composition of soda-lime-silica glass.

TABLE I

Melting glass composition $Fe_2O_3$—$TiO_2$

| | Sample | | | | | |
|---|---|---|---|---|---|---|
| | 1 | 2 | 3 | 4 | 5 | 6 |
| Thickness (mm) | 3.11 | 3.19 | 3.15 | 3.18 | 3.22 | 3.08 |
| | % by weight | | | | | |
| Total Iron (Expressed as $Fe_2O_3$) | 0.0125 | 0.0153 | 0.0153 | 0.0237 | 0.0236 | 0.0236 |
| $TiO_2$ | 0.005 | 0.005 | 0.262 | 0.005 | 0.262 | 0.605 |
| FeO (Ferrous expressed as Ferric) | 0.0029 | 0.0034 | 0.0036 | 0.0059 | 0.0054 | 0.0057 |
| $Fe_2O_3$ (Ferric) | 0.0096 | 0.0119 | 0.0117 | 0.0178 | 0.0182 | 0.0179 |
| % Reduction of Iron to FeO | 23.5 | 22.0 | 23.6 | 24.8 | 23.1 | 24.1 |
| TUV (%) | 80.5 | 79.0 | 79.0 | 75.6 | 74.5 | 75.0 |
| TL (%) | 90.1 | 89.7 | 90.8 | 89.5 | 90.4 | 91.7 |
| TE (%) | 89.4 | 89.0 | 89.6 | 88.3 | 88.8 | 89.4 |
| | COLOR TRANSMITTED | | | | | |
| L | 94.9 | 94.7 | 95.3 | 94.6 | 95.1 | 95.7 |
| Ah | −0.14 | −0.17 | −0.15 | −0.23 | −0.23 | −0.25 |
| Bh | 0.16 | 0.18 | 0.22 | 0.19 | 0.25 | 0.27 |
| X | 88.3 | 87.8 | 87.6 | 87.6 | 88.6 | 89.8 |
| Y | 90.1 | 89.7 | 90.8 | 89.5 | 90.4 | 91.7 |
| Z | 106.3 | 105.7 | 102.6 | 105.5 | 106.5 | 107.9 |
| Dominant wavelength | 568.9 | 564.5 | 569.9 | 551.2 | 562.1 | 559.9 |
| Excitation Purity (%) | 0.1 | 0.1 | 0.2 | 0.1 | 0.1 | 0.2 |

Table I shows that when the $TiO_2$ was added to the soda-lime-silica glass composition, the light transmission is increased to a level of $Fe_2O_3$ that is less than 0.03%.

In samples 4 and 6, it can be observed that the light transmission increased from 89.5 to 91.7, when the percentage of $TiO_2$ was increased by 0.6%. However, in these cases, similar concentrations of the $Fe_2O_3$ were maintained.

The presence of $TiO_2$ slightly diminishes the ultraviolet transmission level to a low level of $Fe_2O_3$; and the presence of $TiO_2$ slightly increases the direct heat transmission to a low percentage of $Fe_2O_3$.

Finally regarding graphs 1-3, these were plotted individually considering % $TiO_2$ in sample vs. the % TUV, % TL and % TE, which were obtained from Table 1. The data obtained for the % $TiO_2$ were plotted to show the behavior of the $Fe_2O_3$—$TiO_2$.

All the fusions were presented under same conditions of oxide-reduction in the batch and also in the furnace. Only the % wt of the components were modified.

From the above, a colorless glass composition has been described and will apparent for the experts in the art that many other features or improvements can be made, which can be considered within the scope determined by the following claims.

What is claimed is:

1. A colorless glass composition having a base glass composition, comprising, in weight percentage: from 70 to 75% of $SiO_2$, from 10 to 15% of $Na_2O$, from 5 to 10% of CaO, from 0 to 5% of MgO, from 0.0 to 3% $K_2O$, from 0.1 to 1.0% $Al_2O_3$% and compounds consisting of from about 0.01 to 0.03% of $Fe_2O_3$ from about 20 to 30% reduction ($Fe^{2+}$) and from about 0.2 to 1% of $TiO_2$ ($Ti^{4+}$), the glass having a visible light transmission of at least 89%, an ultraviolet radiation transmittance of no more than 81%, solar direct transmittance of no more than 90%, a dominant wavelength from 600 nm to 490 nm, and a purity of less than 2%.

2. The colorless glass composition as defined in claim 1 wherein said glass has a color tint as defined in the CIE Hunter Lab illuminant C, in the ranges ah (green-red) from 0 to –1.5; bh (blue-yellow) from –0.5 to 1.0, and having an Lh value greater than 93.

3. The colorless glass composition as defined in claim 1 wherein said glass is produced with a thickness from about 3.2 millimeters.

4. The colorless glass composition as defined in claim 1 wherein the visible light transmission is from about 89.5% to about 91.7%, when the $TiO_2$ has a value of 0.6%.

* * * * *